United States Patent
Haswell

(10) Patent No.: US 10,091,057 B2
(45) Date of Patent: Oct. 2, 2018

(54) CONFIGURING DISTRIBUTED MONITORING SYSTEMS

(71) Applicant: CA, Inc., New York, NY (US)

(72) Inventor: Josiah Daniel Haswell, Fort Collins, CO (US)

(73) Assignee: CA, Inc., New York, NY (US)

( * ) Notice: Subject to any disclaimer, the term of this patent is extended or adjusted under 35 U.S.C. 154(b) by 193 days.

(21) Appl. No.: 14/980,188

(22) Filed: Dec. 28, 2015

(65) Prior Publication Data
US 2017/0187573 A1 Jun. 29, 2017

(51) Int. Cl.
*G06F 15/177* (2006.01)
*H04L 12/24* (2006.01)
*H04L 12/26* (2006.01)
*H04L 29/08* (2006.01)

(52) U.S. Cl.
CPC .......... *H04L 41/0806* (2013.01); *H04L 43/08* (2013.01); *H04L 43/14* (2013.01); *H04L 67/16* (2013.01)

(58) Field of Classification Search
CPC ............. G06F 2201/88; G06F 11/3409; G06F 11/348; G06F 11/3466; G06F 2201/81
See application file for complete search history.

(56) References Cited

U.S. PATENT DOCUMENTS

| | | | |
|---|---|---|---|
| 6,553,387 B1 * | 4/2003 | Cabrera | ............ G06F 17/30371 |
| 7,359,335 B2 | 4/2008 | Knop et al. | |
| 8,959,074 B2 | 2/2015 | Siddiqui et al. | |
| 9,116,862 B1 * | 8/2015 | Rath | .................... G06F 11/2097 |
| 2002/0099579 A1 * | 7/2002 | Stowell | .................. G06Q 10/06 705/7.39 |
| 2006/0179143 A1 * | 8/2006 | Walker | .................. G06F 9/5072 709/226 |
| 2010/0058345 A1 * | 3/2010 | Seidman | ............. G06F 11/3419 718/101 |
| 2015/0088934 A1 * | 3/2015 | Beckman | ............ G06F 21/6227 707/781 |

(Continued)

OTHER PUBLICATIONS

CA Technologies, "CA Unified Infrastructure Management—8.1", What's New, 2015, 4 pages, retrieved on Sep. 9, 2015 from https://wiki.ca.com/display/UIM81/What%27s+New#.

(Continued)

*Primary Examiner* — Peling Shaw
(74) *Attorney, Agent, or Firm* — Gilliam IP PLLC

(57) ABSTRACT

A method, system, and program product for configuring a monitor services cluster. In an embodiment, a discovery server identifies target entities within a service domain. As part of target entity discovery, the discover server identifies service hosts. A configuration manager receives a registration request that specifies a monitor service node having an associated monitor services container that instantiates one or more monitor services that share an execution space. In response to the registration request, the configuration manager compares performance attributes of one or more of the service hosts with service requirements of the one or more monitor services. The configuration manager generates a response to the registration request based, at least in part, on said comparing the performance attributes with the service requirements.

17 Claims, 5 Drawing Sheets

(56) References Cited

U.S. PATENT DOCUMENTS

| | | | |
|---|---|---|---|
| 2015/0154079 A1* | 6/2015 | Lightner | G06F 11/2023 714/4.11 |
| 2015/0212873 A1 | 7/2015 | Filho et al. | |
| 2015/0278324 A1* | 10/2015 | Wong | G06F 11/08 707/634 |
| 2016/0080502 A1* | 3/2016 | Yadav | H04L 41/12 709/227 |

OTHER PUBLICATIONS

CA Technologies, "CA Unified Infrastructure Management—8.1", Overview, 2015, 6 pages, retrieved on 9/9/25 from https://wiki.ca.com/display/UIM81/CA+UIM+Architecture+Overview.

Microsoft, "Paterns & Practices Proven Practices for Predictable Results", Integration Patterns, Integration Topologies, Message Bus, Jun. 2004, 9 pages, retrieved on Sep. 14, 2015 from https://msdn.microsoft.com/en-us/library/ff647328.aspx.

Nimsoft Corporation, "CMDB Gateway Probe 1.02", Nimsoft Monitor, 2011, 30 pages, retrieved on Sep. 8, 2016 from https://support.nimsoft.com/files/archive/00212/CMDB%20Gateway%20Probe.pdf.

Servicenow, "Using Probes for Discovery", Servicenow Production Documentation, 2015, 2 pages, retrieved on Sep. 8, 2015 from http://wiki.servicenow.com/index.php?title=Getting_Started_with_Agentless_Discovery#gsc.tab=0.

* cited by examiner

CONFIGURING DISTRIBUTED MONITORING SYSTEMS

BACKGROUND

The disclosure generally relates to the field of Information Technology (IT) infrastructure management, and more particularly to configuring distributed monitoring systems.

Computer infrastructure monitoring systems are utilized to determine, track, and manage data processing and network infrastructures comprising components, devices, and subsystems. As part of management, monitoring systems are also utilized to detect and track performance metrics (e.g., QoS metrics) of components, devices, and subsystems implemented within data processing and networking systems. Monitoring systems typically include an infrastructure management database (IMDB) that records components, devices, and subsystems (IT assets) as well as descriptive relationships between the assets. The IMDB also stores performance metrics associated with the components, devices, and subsystems. Agent-based or agentless services are utilized to collect the identities, connectivity configurations, and performance metrics of the IT assets.

Significant aspects of a monitoring configuration include deployment of data collection services and the manner in which collected data is communicated, managed, and stored. A monitoring system's configuration varies based on the target infrastructure, and may become a complex task particularly for larger, heterogeneous target systems.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without some of these specific details. In other instances, well-known instruction instances, protocols, structures and techniques have not been shown in detail in order not to obfuscate the description.

Overview

The present disclosure describes systems and methods for monitoring the operations of an IT system that may comprise computer hardware, software, networking components, etc. In an embodiment, a monitor services cluster includes multiple monitor service nodes for detecting and tracking performance metrics and availability of hardware, firmware, and software in a service domain. For example, the service monitor nodes may be configured as a replication quorum comprising a quorum master nodes and member nodes. The quorum master node performs monitoring services in addition to controlling membership and other management requirements of a quorum within the service domain. The performance metrics may include direct and indirect metrics such as processing speed, link throughput associated with operations of the components, devices, subsystems, and systems (target entities) within a service domain. The monitor services cluster may include a cluster management server that includes a configuration manager that that collects and records the performance and availability metrics within an infrastructure management database (IMDB). In an embodiment, the cluster management server communicates with the monitor service nodes via a messaging infrastructure enabling different systems to communicate through a shared set of interfaces.

The following description includes the terms "robot" and "probe" that each signify a category of program code that cooperatively function to collect data within a service domain. A probe generally represents a relatively small code item (e.g., command, query) for managing particular components on a monitored device (i.e., target device) to detect/collect performance data about the device. For example, a probe may be configured as a monitor probe that detect CPU or memory utilization on a target host device. A robot generally refers to a type of probe that is used to schedule and manage the operations of one or more other probes, such as monitoring probes.

Figure 1:
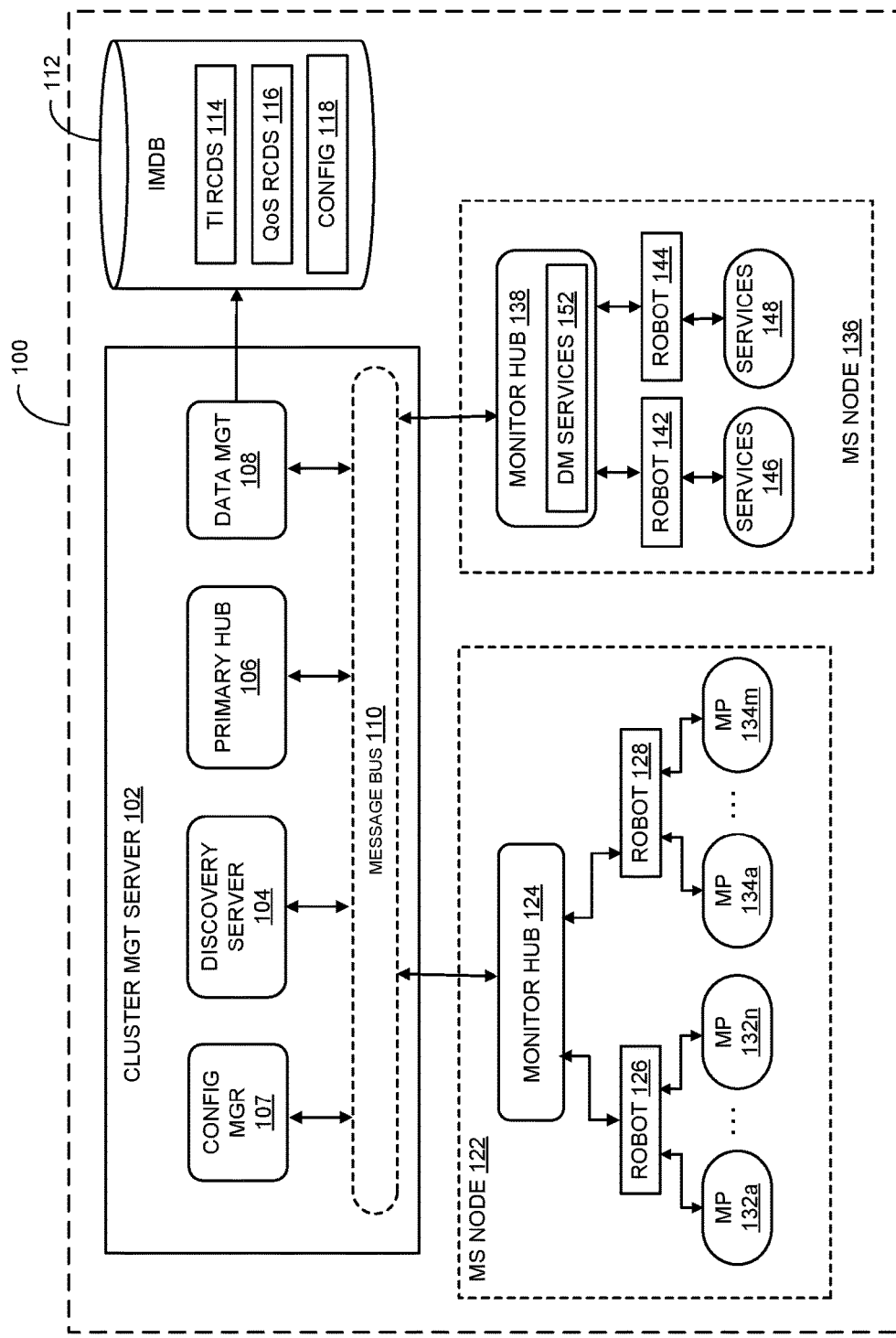
FIG. 1 is a block diagram depicting components of a monitor services cluster including agent-based and service-based monitor services in accordance with an embodiment.

FIG. 1 is a block diagram depicting components of a monitor services cluster 100 that employs agent-based and service-based monitor services in accordance with an embodiment. Monitor services cluster 100 is implemented within a computer and/or network system such as a single server, a processing cluster, a data center etc. Primary high-level functions of monitor services cluster 100 include detecting and collecting performance data as well as providing intermediate processing of the performance data prior to access by monitor service clients (not depicted). The "cluster" aspect of cluster management server 100 is embodied by multiple monitor service nodes including monitor service nodes 122 and 136. Monitor service nodes 122 and 136 detect and collect performance and availability data from target infrastructure components (not depicted) system as processors, storage components, network components, applications, etc.

Other primary functions of monitor services cluster 100 include correlating and aggregating performance and availability data provided by monitor service nodes 122 and 136. Correlation and aggregation functions are primarily performed by IMDB 112 in cooperation with a primary hub 106 and a data management server 108 within cluster management server 102. Transmission of the collected data between cluster management server components such as primary hub 106, data management server 108, and monitor service nodes 122 and 136 is enabled by a message bus, conceptually represented as message bus 110. Message bus 110 comprises multiple software services that provide a publish/subscribe communication interface for components within the monitor services cluster 100. Specifically, message bus 110 comprises program components that together with associated application program interfaces (APIs) enable the monitoring components (e.g., monitor service nodes 122 and 136) to intercommunicate as well as to communicate with the components within cluster management server 102 without direct, program-to-program connections. In addition, message bus 110 provides access between components within cluster management server 102 and infrastructure management database 112. It should be noted that while some message bus connectivity is expressly depicted in FIG. 1, additional component-to-message bus logical connectivity may be implemented.

As shown in FIG. 1, message bus hub components are included within cluster management server 102 as well as within each of monitor service nodes 122 and 136. A hub component is generally a software component that enables other monitor services cluster components to connect to a message bus such as message bus 110. For instance, a hub may be a robot that binds other robots, such as robots 126 and 128 discussed below, into a logical group with the hub as the central connection point. A hub may similarly interconnect other hubs within a hub hierarchy. A hub may receive all or a portion of all messages posted by any message bus client component and distribute the messages to a programmatically specified set of associated subscriber client components. A hub may also track the addresses in a given monitor service domain, in addition to information about each of the target entities being monitored by the cluster.

Cluster management server 102 includes a primary hub 106, which comprises program instructions for communicating with IMDB 112. Monitor service node 122 comprises a monitor hub 124 communicatively coupled with robots 126 and 128, which are communicatively coupled with sets of monitoring probes 132a-132n and 134a-134m, respectively. Monitor hub 124 comprises one or more program instructions for enabling access by monitor service node 122 to the publish/subscribe interface of message bus 110. The monitoring probes 132a-132n and 134a-134m each comprise one or more program instructions (e.g., command, query, etc.) for detecting and/or collecting performance and/or availability data from a target entity such as a memory component. The monitoring probes within monitor service node 122 are deployed within the target entity components (e.g., within a network router) as determined by the monitoring configuration. Robots 126 and 128 may comprise service probes that collect and disseminate the performance/availability data from the respective monitoring probes. Robots 126 and 128 further manage the monitoring probes such as by determining monitor probe activation intervals. For instance, each of robots 126 and 128 may include a controller that maintains and manages their respective monitoring probes and a spooler that receives messages from the monitoring probes.

The agent-based monitor probe deployed performed by monitor service node 122, enables deployment of single-purpose monitor probes/agents to be deployed from within various target entity components such as a network router. However, such dispersed deployment may result in significant inter-probe processing delays such as may result from context switches and corresponding interrupts within the robots 126 and 128 and/or within monitor hub 124. As an alternative form of infrastructure monitoring mechanism, monitor services cluster 100 further includes agent-less service monitor node 136, which in contrast to monitor service node 122 does not utilize remotely deployed monitoring agents. Instead, service monitor node 136 deploys services containers 146 and 148 via robots 142 and 144, respectively. Service containers 146 and 148 are configured to instantiate multiple services comprising program instructions for detecting and collecting performance metrics from target entities. In an embodiment, service containers 146 and 148 instantiate the services within the processing systems (e.g., system memory) of respective service host target entities such as server systems. Furthermore, either or both of service containers 146 and 148 may instantiate monitor services that all (i.e., within each respective service container) share an execution space, thereby precluding some or all context switch interrupts that would otherwise interrupt the processing tasks performed within a given service container. As explained in further detail below, such multiple monitoring service container may require enhanced procedures for selecting target entities from which to deploy the monitor services.

Monitor service node 136 further includes a monitor hub 138 that provides connectivity to other cluster components via message bus 110. In addition, monitor hub 138 includes a data management services module 152 that comprises program instructions for organizing data received from the multiple services 146 deployed by robot 142 and the multiple services 148 deployed by robot 144. For instance, data management services module 152 may comprise program instructions for determining whether one or both of service sets 146 and 148 comprise service application containers in which multiple applications threads within each container all share an execution space. In response to determining that each of service sets 146 and 148 comprise such service application containers, data management services module 152 may transmit a message to cluster management server 102 to record the service container attribute information in association with each of the respective monitor services nodes and/or monitor services.

While not expressly shown in FIG. 1, monitor services cluster 100 may include monitor service nodes belonging to one or more replication quorums for managing replication of monitor services data. For example, monitor service nodes 122 and 136 may be configured by cluster management server 102 as belonging to a replication quorum that may include additional agent-based and/or service-based monitor service nodes. Data management services module 152 may provide controlled access by each of monitor service nodes 122 and 136 to respective file system instances based on the replication quorum identity and also based on the respective monitor service node identities.

Whether or not configured within replication quorums, the monitor service nodes 122 and 138 collect target entity performance data and send that data to be aggregated and correlated by cluster management server 102. To this end, primary hub 106 coordinates communications between the monitor service nodes 122 and 136 and IMDB 112, enabling performance/availability data to be stored in logical association with target entity identifiers and with monitor service node identifiers. For instance, IMDB 112 may implement an object-based storage architecture in which target entity performance data items are stored as objects having a specified device object ID corresponding to the type or instance of target entity. Each performance data object may further include metadata that associates the device object ID with the monitor service node that is configured to monitor the target. For instance, performance data objects may be stored within QoS records 116, having device object IDs corresponding to respect target entities, and further having metadata identifying the container service and/or monitoring probe utilized to collect the data.

IMDB 112 further includes configuration records 118 for storing data related to the component membership, connectivity, and other aspects of the logical configuration of monitor services cluster 100. For instance, configuration records 118 may comprise a collection of data objects that specify the monitor/collection entities (e.g., multiple monitor services, a container that instantiates the services, etc.).

IMDB 112 further includes target infrastructure entity (alternatively, "target entity") records 114. In an embodiment, target entity records 114 comprise data objects containing target entity performance data and having an object ID corresponding to a target entity (e.g., particular processor).

In addition to the runtime monitoring components, cluster management server 102 includes a discovery server 104 and a configuration manager 107. Discovery server 104 includes program instructions for deploying and communicating with corresponding discovery probes (not depicted) to identify target entities within a service domain. For instance, discovery server 104 may deploy a discovery probe within a network router to collect device IDs for devices communicating across the router. The device IDs may be retrieved by discovery server 104 from message bus 110 using a designated subscribe interface. The discovery probe may collect and discovery server 104 consequently retrieve other target entity information such as performance attributes, device category, etc.

Configuration manager 107 functions in cooperation with discovery server 104 to determine target entity membership of a service domain and utilize the membership information to configure one or more monitor service nodes within monitor services cluster 100. In an embodiment, configuration manager 107 comprises program instructions for retrieving target entity information from discovery servicer 104 and/or IMDB 112. For instance, configuration manager 107 may access IMDB 112 via message bus 110 to retrieve target entity records that specify device object IDs in association with respective target entity descriptive information. Among the target entities identified and recorded within infrastructure database 112 may be one or more monitoring service hosts (service hosts) that are target entities that supply the processing and/or storage platform from or on which the monitoring service node components are deployed. As utilized herein, a service host is a target entity within the target infrastructure that effectively hosts one or more monitor services and/or probes by allocating processing, memory, and/or other hardware and/or software resources in support of infrastructure monitoring activity. A given service host may comprise one or more target entities. For instance, a service host entity may include multiple processor, storage device, and network component target entities that together operate as computer/network system.

In an embodiment, configuration manager 107 may receive a registration request for a new monitor service node to be included within monitor services cluster 100. The registration request identifies or otherwise specifies the monitor service node in terms of the monitoring/collection capabilities of its constituent monitoring probes or monitor services. In an embodiment, configuration manager 107 processes the request to determine service requirements associated with the monitor services and/or probes to be deployed. Configuration manager 107 may further determine the service requirements based on the current monitoring service coverage within the service domain. For instance, configuration manager 107 may retrieve target entity coverage data as stored within records 114 and 118. The service requirement(s) determined by the combination of request and stored target entity coverage data may be represented as one or more performance metrics such as processing speed, network link throughput, etc.

In processing or otherwise responding to the registration request, configuration manager 107 also determines performance attributes of target entities that have been flagged, or otherwise distinctly identified, as being prospective service hosts for the monitor service node specified by the request.

For example, configuration manager 107 may access performance metric data associated with service host records within target entity records 114 and QoS records 116. Having obtained the services requirements of the requested monitor service node as well as performance attributes of prospective service hosts, configuration manager 107 either directly or indirectly compares the service requirement(s) with the performance attribute(s) to determine how to respond to the request as explained in further detail with reference to FIGS. 2-4.

Figure 2:
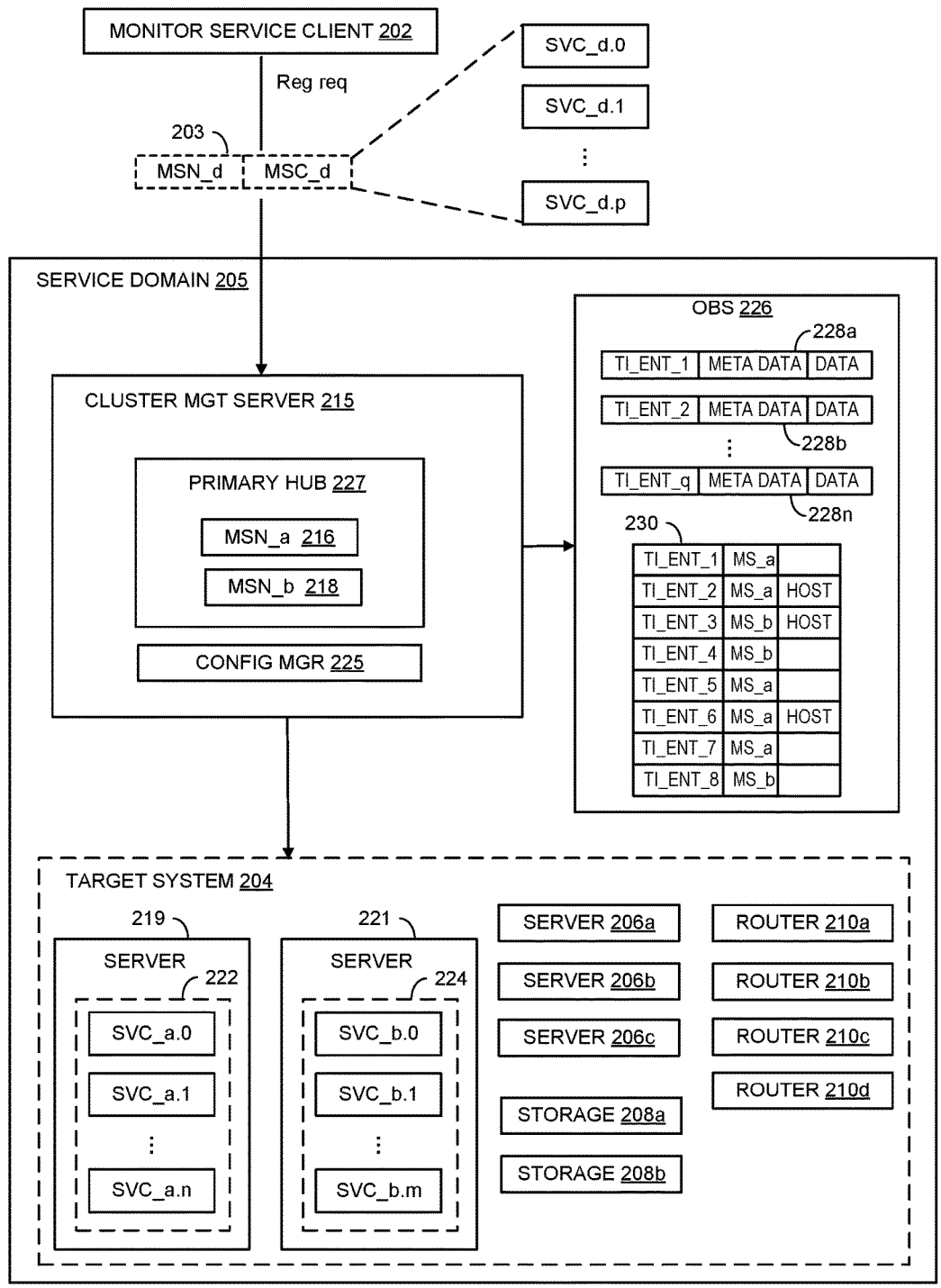
FIG. 2 is a block diagram illustrating a monitor services cluster configured within a service domain in accordance with an embodiment.

FIG. 2 is a block diagram illustrating a monitor services cluster configured within a service domain 205 in accordance with an embodiment. Service domain 205 may be generally characterized as comprising multiple computing and/or networking systems, subsystems, devices, components whether configured as hardware, software, firmware or any combination thereof. The monitor services cluster components deployed within service domain 205 include a cluster management server 215 and an object-based storage 226. Cluster management server 215 may be configured to include one or more of the cluster management server components depicted in FIG. 1, including a primary hub 227 and a configuration manager 225. As shown in FIG. 2, primary hub 227 includes monitor service nodes MSN_a 216 and MSN_b 218 that are each configured within and across cluster management server 215 and target devices similar to the service-based monitor service node 136 in FIG. 1. Namely, monitor service node 216 comprises a monitor services container 222 deployed within a target infrastructure server 219, and monitor service node 218 comprises a monitor services container 224 deployed within a target infrastructure server 221. Monitor services container 222 instantiates multiple monitor services SVC_a.0 through SVC_a.n within the processing/storage resources of server 219 and monitor services container 224 instantiates multiple monitor services SVC_b.0 through SVC_b.m within server 221. Within each of monitor services containers 222 and 224, the multiple monitor services share an execution process space by implementing some form of execution/container isolation to prevent external interruptions such as via context switches.

Service domain 205 further includes the specified set of target entities to be monitored by the components of the monitor services cluster. In the depicted embodiment, the target entities are represented collectively as a target system 204, which may be a set systems, subsystems, devices, and components for implementing of one or more large-scale computing and/or networking systems. For instance, target system 204 is represented as including, in addition to servers 219 and 221, servers 206a-206c, storage devices 208a-208b, and routers 210a-210d. Cluster management server 215 may or may not be included within target system 204 and includes program instructions for discovering the entity membership of target system 204 and for recording device object IDs in association with corresponding performance attributes. In an embodiment, the performance attributes may be represented as device performance metrics such as processing speed or maximum processing throughput that may be pre-specified by encoded device data. In addition, or alternatively, the performance attributes may be device performance metrics that are measured or otherwise detected by monitor service components during operation of the system.

Having determined target entity membership, including updates to a previous membership determination, cluster management server 215 directly or indirectly (e.g., via a database server) records the membership data within object-based storage 226. In the depicted embodiment, cluster management server 215 records the membership data as target entity objects 228a-228n that logically associate device IDs with respective data and metadata. For example each of target entity objects 228a-228n includes a device object ID field (depicted as TI_ENT_1 through TI_ENT_q for the respective objects). In logical association with the device object IDs are the objects' data (DATA) which may include device category information (e.g., model number), and the objects' metadata (METADATA) which may indicate whether the device is a prospective monitor services host device. The membership data recorded/updated within object-based storage 226 by cluster management server 215 further comprises a monitoring coverage table 230 that logically associates discovered target entities with monitor service nodes and further specifies for each, whether the target entity is a monitor service host. For example, monitoring coverage table 230 is depicted as including eight row-wise entries that each associate one of device object IDs, TI_ENT_1 through TI_ENT_8 with one of either of monitor service nodes MS_a or MS_b. Monitoring coverage table 230 further includes flag entries "HOST" for indicating that, for example, devices TI_ENT_2, TI_ENT_3, and TI_ENT_6 are monitor service hosts that provide processing, storage, or other resources for supporting the operations of monitor service nodes and their constituent components.

Configuration manager 225 includes program instructions for processing monitor service node registration requests such as the depicted registration request 203 that may be sent from a monitor service client 202. In an embodiment, monitor service client 202 may comprise a combination of hardware and software components that are logically configured to allow a human or automated user to generate, access, and modify the monitor services cluster within service domain 205. In the depicted embodiment, the monitor services cluster has already been established with the deployment and operation of monitor service nodes 216 and 218 and registration request 203 specifies a monitor service node MSN_d to be incorporated within the cluster. As further shown, the registration request 203 further specifies a monitor services container MSC_d that is associated with the monitor service node and which includes multiple monitor services, SVC_d.0 through SVC_d.p that share an execution space when deployed.

Figure 3:
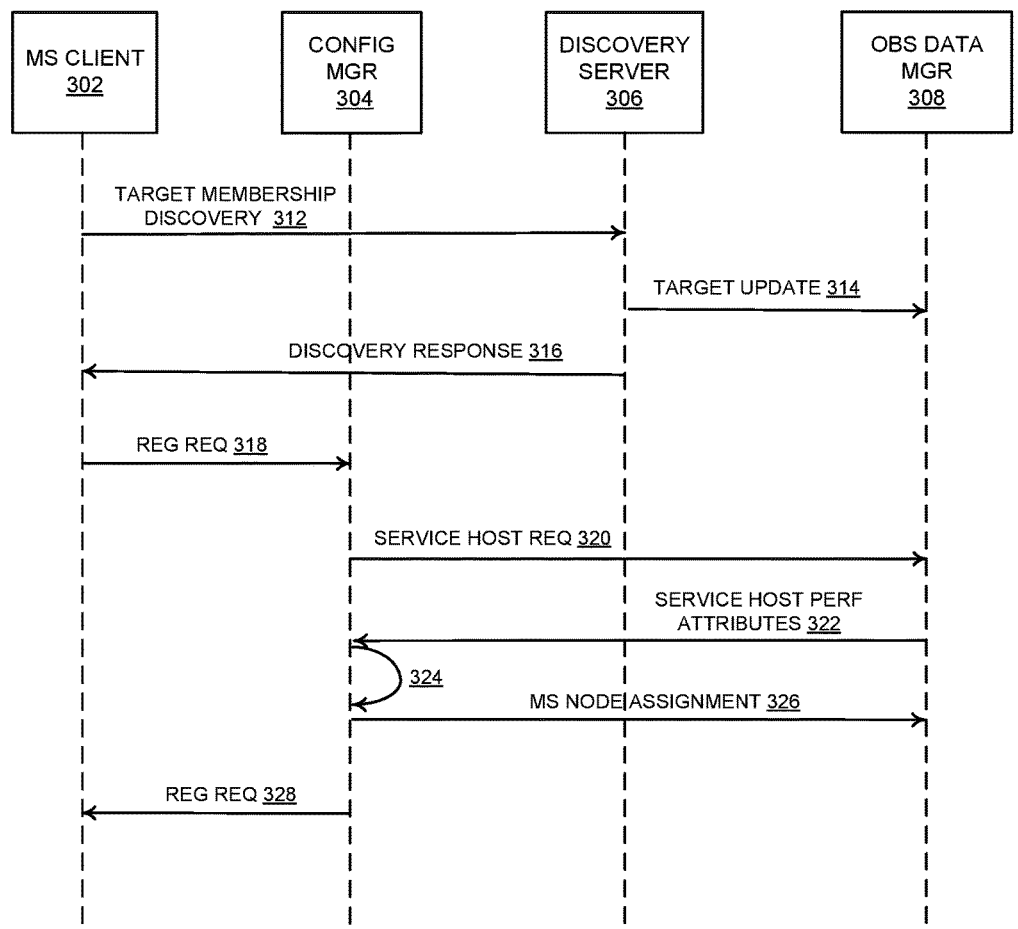
FIG. 3 is a signaling diagram depicting messaging sequences among entities within a monitor services cluster in accordance with an embodiment.

FIG. 3 is a signaling diagram depicting messaging sequences among entities within a monitoring services cluster in accordance with an embodiment. The depicted messaging sequence may be performed by one or more of the monitor services cluster components depicted in FIG. 1 and FIG. 2. As shown in FIG. 3, a sequence may commence with a monitor service client 302 transmitting a target membership discovery request 312 to a discovery server 306. The discovery request 312 may comprise a command or instruction and further specify one or more service domains for which target entity discovery is to be performed. In response to discovery request 312, discover server 306 deploys or otherwise communicates with one or more discovery probes instantiated or otherwise deployed within the service domain(s) to commence target entity discovery. The target entity discovery process may be an initial discovery process for initially identifying target entities within a domain for which a monitor services cluster is yet to be configured or may be an update discovery process.

Discovery server 306 retrieves target entity membership data from the probes and transmits a target update message 314 to an object-based data manager 308, which in one embodiment is an object-based storage system. Also, following retrieval of the target membership update data, discovery server 306 transmits a discovery response 316 to monitor services client 302 that may indicate a successful completion of a discovery update cycle and may further indicate the status of monitoring coverage with respect to the current target entity membership.

Either in sync with or in relative disassociation with one or more target entity discovery cycles, monitor services client 302 may transmit a monitor service node registration request 318 to configuration manager 304. Configuration manager 304 processes request 318 to identify one or more monitor service nodes specified by the request (i.e., monitor service node(s) requested to be incorporated within the cluster). In response, configuration manager 304 generates and transmits a service host request 320 to object-based data manager 308, which responds by searching records to identify one or more target entities categorized as actual or prospective service hosts. Object-based data manager 308 then transmits a response 322 to configuration manager 304 that specifies the one or more target entities identified within the object-based data storage as service hosts. Response 322 may further include performance attribute data associated within objects/records with each of the identified service hosts. Configuration manager 304 processes the identified service host IDs and associated performance attributes with collect monitor service coverage data to generate and record monitor service node assignments 326 that are stored by object-based storage manager 308. Following the new monitor service node assignments, configuration manager 304 generates and transmits a registration response 328 to monitor service client 302.

Figure 4:
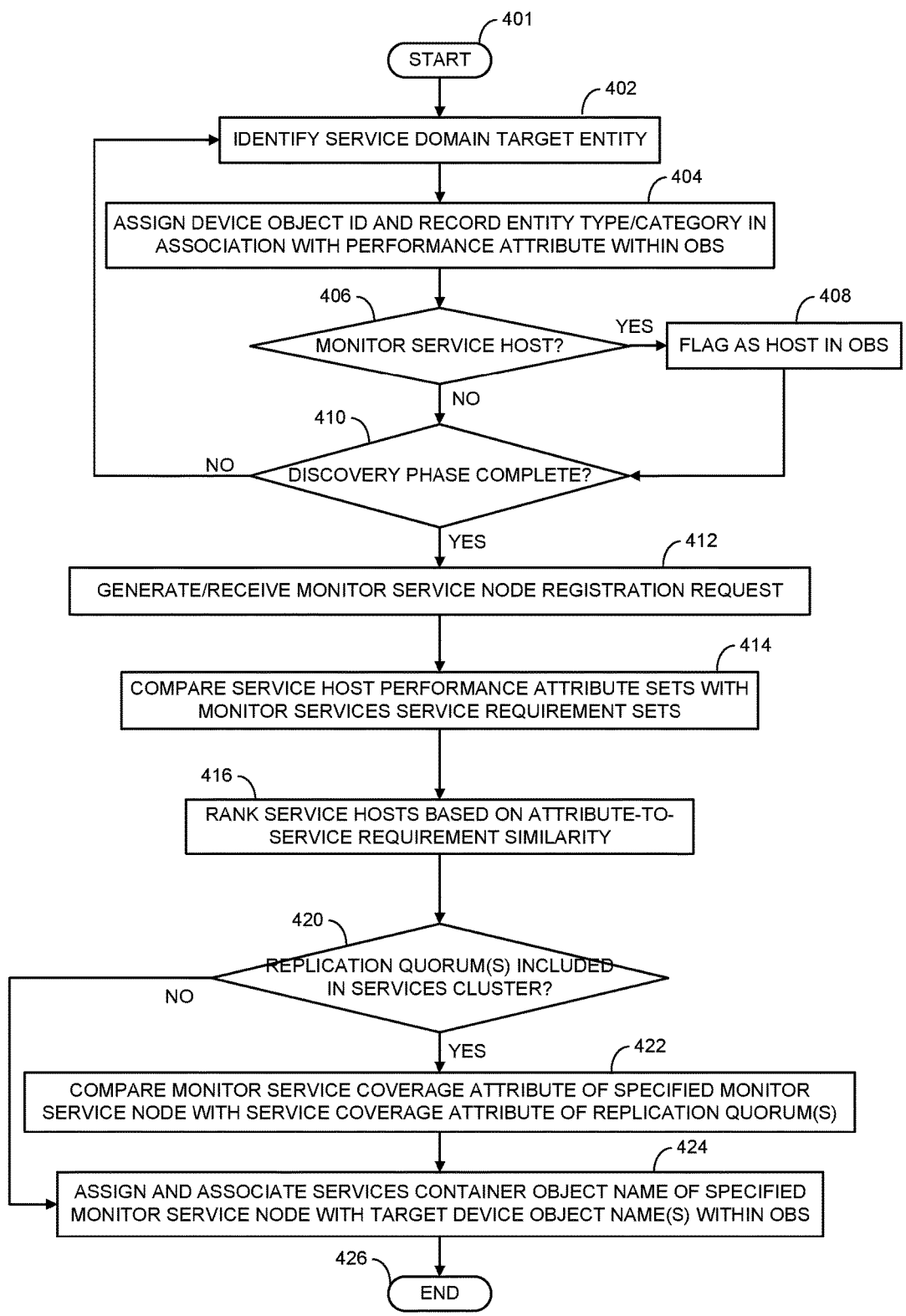
FIG. 4 is a flow diagram illustrating operations and functions for configuring a monitor services cluster in accordance with an embodiment.

FIG. 4 is a flow diagram illustrating operations and functions for configuring or reconfiguring a monitor services cluster in accordance with an embodiment. The operations and functions depicted in FIG. 4 may be performed by one or more of the components described with reference to FIGS. 1-3. The process begins as shown at block 401 and proceeds to block 402 with a discovery server identifying a target entity such as a processing, server, network link, etc., within a specified service domain. The target entity identification may comprise interaction between a discovery server and a discovery service probe which, for example, may monitor network traffic to detect target entities. The discovery server may transmit the target entity identification data to a configuration manager which, at block 404, assigns a device object ID and generates an object-based record that associates the object ID with entity type (e.g., processor) and performance attribute data. For instance, the configuration manager may assign device object IDs as object-based storage keys within an object-based storage container. In response to determining that the identified target entity is a service host, the configuration manager and/or database manager asserts a service host flag associated with the device object ID (blocks 406 and 408). In response to either setting the service host flag or determining the identified target entity not to be a service host, the discovery cycle returns from block 410 to block 402 until discovery within a service domain is complete.

Following the target entity membership discovery cycle, the configuration manager may receive a monitor service node registration request (block 412). The registration request may specify one or more monitor service nodes which may each be associated with a monitor services container that instantiates multiple monitor services that share an execution space. In response to the request, the configuration manager compares performance attributes of one or more service hosts with service requirements of the monitor services (block 414). For example, the service requirement values may include performance level values (processing, storage, etc.) that are specified within an IMDB in association with respective target entities as requirements for generating (i.e., detecting and collecting) and transmitting performance data during operation of the target entities. In such a case, the service requirement value(s) may be determined based on the specified processing requirements for generating and transmitting the data. In an embodiment, a performance attribute value may be quantified as a processing throughput capacity value and the service requirement may specify a throughput threshold value. The service requirement value(s) may also be determined based, at least in part, on the extent of coverage currently provided by monitor service node(s) across the service domain. The monitoring coverage may be determined based on the discovered and otherwise recorded target entities and the extent to which monitor service nodes have been allocated to the target entities. In an embodiment, the configuration manager or discovery server may determine the service requirement value(s) by scanning performance metrics associated with the discovered target entities and associating one or more of the performance metrics with the monitor services.

In an embodiment, the performance attributes for multiple prospective service hosts are collected into structured sets, such as an array or other vector-type data structure and processed with respect to a similarly formatted data structure containing the service requirement values. The processing of the performance attribute values of a given set with the service requirements may entail, for example, determining similarities between attribute values and service requirement values that is used to generate a distance or "angle" value between each service host attribute set and the service requirement set. Having computed the similarity distance value for each of the service host systems, the configuration manager ranks the compatibility of the service hosts systems to host the requested monitor service node based on similarity distance values (block 416).

Having ranked the prospective services hosts, the configuration manager may further determine whether the monitor services cluster comprises one or more replication quorums, each comprising two or more monitor service nodes (block 420). In response to determining that the monitor services cluster includes replication quorum(s), the configuration manager may compare one or more monitor service coverage attribute(s) of the monitor service node specified by the request with service coverage attributes of the replication quorums (block 422). Control then passes to block 424 with the configuration manager responding to the registration request by incorporating, via logical association within the IMDB or otherwise, the monitor service node within the monitor services cluster. In an embodiment, the configuration manager incorporates the monitor service node by assigning and associating a services container object name with target device object names within the object-based storage. If the services cluster was found at block 420 to include a replication quorum, the response at block 424 may include incorporating the monitor service node within the replication quorum based on the comparison at block 422. For instance, if the comparison resulted in a determination that the monitor service coverage attribute of the specified monitor service node is the same as or otherwise functionally consistent with the monitor service coverage attribute of the quorum, the configuration manager incorporate the monitor service node within the quorum. The process ends as shown at block 426.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
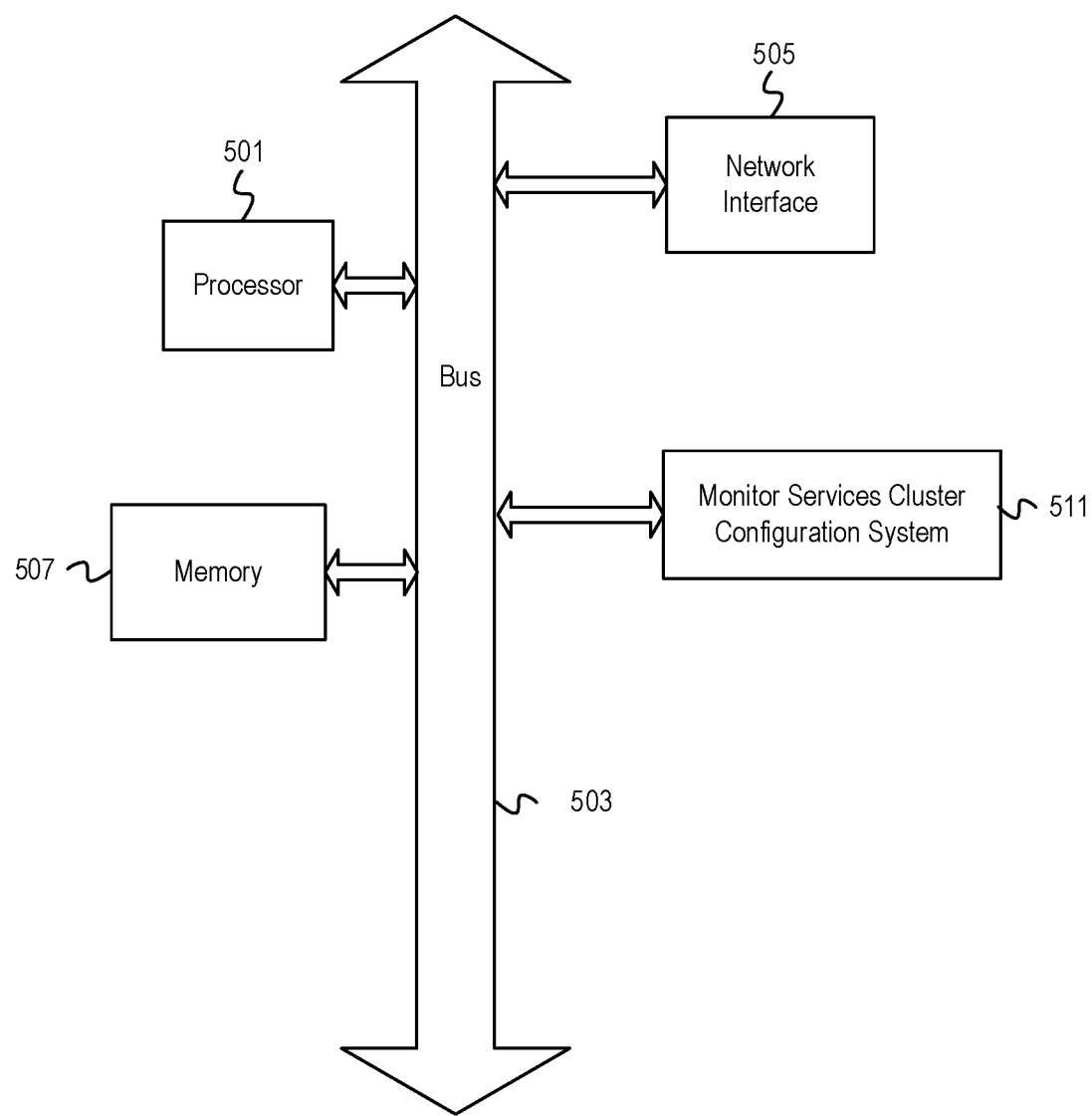
FIG. 5 depicts an example computer system that includes a monitor services cluster configuration system in accordance with an embodiment.

FIG. 5 depicts an example computer system that implements monitor services cluster configuration in accordance with an embodiment. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes a monitor services cluster configuration system 511. The monitor services cluster configuration system 511 provides program structures for collecting, storing, and processing identity information within identity and account profile data structures. The identity information is recorded in attribute fields of respective identity and account profiles and is compared using one or more matching functions to determine correlations between identity and account profile schemas. The monitor services cluster configuration system 511 uses the schema correlations to associate system resource accounts to the identity profiles and further applies the account-to-identity associations in combination with the profile schema correlations to synchronize data between the identity profiles and the account profiles. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for an object storage backed file system that efficiently manipulates namespace as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:

1. A method for configuring a monitor services cluster that includes at least one replication quorum consisting of multiple monitor service nodes, said method comprising:
   determining target entity membership within a service domain including identifying a target entity to be monitored within a service domain, wherein said identifying a target entity comprises determining that the target entity is a service host that is configured to deploy monitor service nodes to monitor target entities within the service domain;
   in response to a registration request that specifies a monitor service node having an associated monitor services container that instantiates a plurality of monitor services that share an execution space, comparing a performance attribute of said service host with a service requirement of the monitor services;
   determining a monitor service coverage attribute of the at least one replication quorum;
   comparing a monitor service coverage attribute of the monitor service node specified by the registration request with a monitor service coverage attribute of the at least one replication quorum; and
   generating a response to the registration request based, at least in part, on said comparing the performance attribute with the service requirement and said comparing the monitor service coverage attribute of the monitor service node specified by the registration request with the monitor service coverage attribute of the at least one replication quorum, said generating the response to the registration request including,
      in response to determining that the performance attribute meets or exceeds the service requirement and based on a result of said comparing the monitor service coverage attribute of the monitor service node specified by the registration request with the monitor service coverage attribute of the at least one replication quorum, incorporating the monitor service node within the monitor services cluster including incorporating the monitor service node within one of the at least one replication quorum.

2. The method of claim 1, wherein the one or more monitor services generate performance data associated with target entities, said method further comprising determining the service requirement based, at least in part, on processing requirements for generating and transmitting the performance data.

3. The method of claim 1, wherein said identifying target entities comprises, for at least one of the identified target entities, recording an entity type in logical association with an entity performance attribute.

4. The method of claim 1, wherein said identifying target entities comprises:
- identifying a device within the service domain;
- assigning a device object name to the device; and
- maintaining the device object name as an object storage key in an object-based storage container.

5. The method of claim 4, wherein said incorporating the monitor service node includes,
- assigning a services container object name to the monitor services container; and
- logically associating the services container object name with the device object name within the object-based storage container.

6. The method of claim 4, further comprising:
- determining monitor service coverage of the service domain based, at least in part, on the identified target entities; and
- determining the service requirement based, at least in part, on the determined monitor service coverage.

7. The method of claim 6, wherein said determining monitor service coverage comprises determining whether target entities are monitored based, at least in part, on logical associations between one or more services container object names and device object names within the object-based storage container.

8. The method of claim 1, further comprising determining the service requirement by:
- scanning performance metrics associated with the identified target entities; and
- associating one or more of the performance metrics with at least one of the one or more monitor services.

9. One or more machine-readable storage media having program code for configuring a monitor services cluster that includes at least one replication quorum consisting of multiple monitor service nodes, the program code comprising instructions to:
- determine target entity membership within a service domain including identifying a target entity to be monitored within a service domain, wherein said identifying a target entity comprises determining that the target entity is a service host that is configured to deploy monitor service nodes to monitor target entities within the service domain;
- in response to a registration request that specifies a monitor service node having an associated monitor services container that instantiates a plurality of monitor services that share an execution space, compare a performance attribute of said service host with a service requirement of the monitor services;
- determine a monitor service coverage attribute of the at least one replication quorum;
- compare a monitor service coverage attribute of the monitor service node specified by the registration request with a monitor service coverage attribute of the at least one replication quorum; and
- generate a response to the registration request based, at least in part, on said comparing the performance attribute with the service requirement and said comparing the monitor service coverage attribute of the monitor service node specified by the registration request with the monitor service coverage attribute of the at least one replication quorum, said generating the response to the registration request including,
  - in response to determining that the performance attribute meets or exceeds the service requirement and based on a result of said comparing the monitor service coverage attribute of the monitor service node specified by the registration request with the monitor service coverage attribute of the at least one replication quorum, incorporating the monitor service node within the monitor services cluster including incorporating the monitor service node within one of the at least one replication quorum.

10. The machine-readable storage media of claim 9, wherein the one or more monitor services generate performance data associated with target entities, said program code further comprising instructions to determine the service requirement based, at least in part, on processing requirements for generating and transmitting the performance data.

11. The machine-readable storage media of claim 9, wherein said identifying target entities comprises, for at least one of the identified target entities, recording an entity type in logical association with an entity performance attribute.

12. The machine-readable storage media of claim 9, wherein said identifying target entities comprises:
- identifying a device within the service domain;
- assigning a device object name to the device; and
- maintaining the device object name as an object storage key in an object-based storage container.

13. The machine-readable storage media of claim 12, wherein said incorporating the monitor service node includes,
- assigning a services container object name to the monitor services container; and
- logically associating the services container object name with the device object name within the object-based storage container.

14. The machine-readable storage media of claim 12, wherein the program code further comprises instructions to:
- determine monitor service coverage of the service domain based, at least in part, on the identified target entities; and
- determine the service requirement based, at least in part, on the determined monitor service coverage.

15. An apparatus comprising:
- a processor; and
- a machine-readable medium having program code for configuring a monitor services cluster that includes at least one replication quorum consisting of multiple monitor service nodes executable by the processor to cause the apparatus to,
  - determine target entity membership within a service domain including identify a target entity to be monitored within a service domain, wherein said identifying a target entity comprises determining that the target entity is a service host that is configured to deploy monitor service nodes to monitor target entities within the service domain;
  - in response to a registration request that specifies a monitor service node having an associated monitor services container that instantiates a plurality of monitor services that share an execution space, compare a performance attribute of at least one of the service hosts with a service requirement of the monitor services;
  - determine a monitor service coverage attribute of the at least one replication quorum;
  - compare a monitor service coverage attribute of the monitor service node specified by the registration request with a monitor service coverage attribute of the at least one replication quorum; and
  - generate a response to the registration request based, at least in part, on said comparing the performance attribute with the service requirement and said comparing the monitor service coverage attribute of the monitor service node specified by the registration request with the monitor service coverage attribute of the at least one replication quorum, said generating the response to the registration request including, in response to determining that the performance attribute meets or exceeds the service requirement and based on a result of said comparing the monitor service coverage attribute of the monitor service node specified by the registration request with the monitor service coverage attribute of the at least one replication quorum, incorporating the monitor service node within the monitor services cluster including incorporating the monitor service node within one of the at least one replication quorum.

16. The apparatus of claim 15, wherein the one or more monitor services generate performance data associated with target entities, and wherein the machine-readable medium further includes program code executable by the processor to cause the apparatus to determine the service requirement based, at least in part, on processing requirements for generating and transmitting the performance data.

17. The apparatus of claim 15, wherein said identifying target entities comprises, for at least one of the identified target entities, recording an entity type in logical association with an entity performance attribute.

\* \* \* \* \*